`US009840573B2`

United States Patent
Fujiyama et al.

(10) Patent No.: US 9,840,573 B2
(45) Date of Patent: Dec. 12, 2017

(54) ACRYLIC COMPOSITION, FORMED BODY, KEY SHEET OF MOBILE TELEPHONE, AND LIGHT GUIDE

(75) Inventors: Kousuke Fujiyama, Otake (JP);
Akikazu Matsumoto, Otake (JP);
Yasuhiko Nabeshima, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 296 days.

(21) Appl. No.: 13/819,475

(22) PCT Filed: Aug. 31, 2011

(86) PCT No.: PCT/JP2011/069765
§ 371 (c)(1),
(2), (4) Date: Apr. 22, 2013

(87) PCT Pub. No.: WO2012/029849
PCT Pub. Date: Mar. 8, 2012

(65) Prior Publication Data
US 2013/0203952 A1   Aug. 8, 2013

(30) Foreign Application Priority Data

Aug. 31, 2010 (JP) .................................. 2010-193508
Apr. 1, 2011 (JP) .................................. 2011-081742

(51) Int. Cl.
| C08F 290/06 | (2006.01) |
| C08F 222/10 | (2006.01) |
| C08F 236/20 | (2006.01) |
| F21V 8/00 | (2006.01) |
| G02B 1/04 | (2006.01) |

(52) U.S. Cl.
CPC .... *C08F 222/1006* (2013.01); *C08F 290/062* (2013.01); *G02B 1/04* (2013.01); *G02B 1/048* (2013.01); *G02B 6/0065* (2013.01); *H01H 2209/082* (2013.01); *H01H 2219/062* (2013.01)

(58) Field of Classification Search
CPC ............ C08F 290/062; C08F 222/1006; C08F 2220/285; C08F 236/20; C08F 220/10; C08F 220/12; C08L 33/08; C08L 33/10
See application file for complete search history.

(56) References Cited

U.S. PATENT DOCUMENTS

| 4,608,423 A * | 8/1986 | Abbey .................. C08F 22/105 526/172 |
| 8,013,091 B2 * | 9/2011 | Obata .................. C08F 220/68 524/553 |
| 2004/0041132 A1 * | 3/2004 | Engardio .......... C08F 222/1006 252/582 |

FOREIGN PATENT DOCUMENTS

| JP | 63 256902 | 10/1988 |
| JP | 02078034 A * | 3/1990 |
| JP | 4 164910 | 6/1992 |
| JP | 2544380 B2 * | 10/1996 |
| JP | 2006 246221 | 10/2008 |
| JP | WO 2009005036 A1 * | 1/2009 ............ C08F 220/68 |
| JP | 2011 111465 | 6/2011 |
| TW | 200909843 A | 3/2009 |

OTHER PUBLICATIONS

Machine Translation of JP 2544380 B; dated Oct. 1996; Abe et al.*
Technical Data (Specialty monomers); BASF; Downloaded on Feb. 6, 2017 from http://www.specialty-monomers.basf.com/portal/streamer?fid=235715.*
U.S. Appl. No. 13/820,394, filed Apr. 23, 2013, Nabeshima, et al.
Extended European Search Report dated Jul. 14, 2015 in Patent Application No. 11821864.3.
Takakazu Kojima, et al., "Swelling of Poly(methyl methacrylate-co-poly(oxytetramethylene)dimethacrylate)s" Macromolecules, vol. 23, No. 23, XP002739431, 1990, pp. 4990-4993.
Yasuhiro Ishikawa, et al., "Synthesis of elastomers. 1. Preparation of telechelic polymers containing two vinyl end groups from polytetramethyleneglycol and the physical properties of the copolymers with methacrylate and acrylonitrile" Database Caplus [Online] Chemical Abstracts Service, XP002739432, May 12, 1984, 2 Pages.
Taiwanese Official Action dated Jan. 5, 2016, in Taiwanese Patent Application No. 100131315 (5 pages).
Office Action dated Jun. 16, 2016 in European Patent Application No. 11 821 864.3.
M.T. T Viciosa, et al., "Dielectric and mechanical relaxation processes in methyl acrylate/tri-ethyleneglycol dimethacrylate copolymer networks" European Polymer Journal, vol. 43, XP022008191, 2007, pp. 1516-1529.
International Search Report dated Nov. 22, 2011 in PCT/JP11/697165 Filed Aug. 31, 2011.

\* cited by examiner

*Primary Examiner* — Karuna P Reddy
(74) *Attorney, Agent, or Firm* — Oblon McClelland, Maier & Neustadt, L.L.P.

(57) ABSTRACT

An acrylic composition, which has excellent flexibility at low temperature and can form a formed body whose adhesion at room temperature is suppressed, the formed body of the acrylic composition, a key sheet of a mobile telephone, and a light guide obtained from the formed body are provided. The acrylic composition contains specific long chain di(meth)acrylate (A) and mono(meth)acrylate (B), and the glass-transformation temperature (TgDMS) of the polymer of the acrylic composition is 40° C. or less. The formed body is obtained by polymerization of the acrylic composition, and the key sheet of the mobile telephone and the light guide are obtained from the formed body.

21 Claims, No Drawings

ACRYLIC COMPOSITION, FORMED BODY, KEY SHEET OF MOBILE TELEPHONE, AND LIGHT GUIDE

TECHNICAL FIELD

The present invention generally relates to an acrylic composition, a formed body, a key sheet of a mobile telephone and a light guide.

BACKGROUND ART

Due to excellent optical properties, acrylic resin is applicable in various fields such as lens, auto parts, lighting parts, and various electronic displays. However, the acrylic resin in the prior art has the disadvantages of poor flexibility.

For the method for obtaining acrylic resin with flexibility, for example, in Patent Document 1, a method of cast polymerization of a polymerizable composition with specific poly(meth)acrylate and monovinyl monomer as main component is proposed. However, although the flexibility at room temperature of the acrylic resin obtained through cast polymerization of the polymerizable composition is improved, the problem that the flexibility at low temperature close to −30° C. is poor occurs.

In addition, as a composition for obtaining a formed body of acrylic resin with excellent flexibility at low temperature, for example, in Patent Document 2, an optical resin composition containing (A) an acrylic acid derivative, (B) an acrylic derivative polymer and (C) a high-molecular-weight crosslinking agent is proposed. However, due to strong adhesion, a formed body obtained in Patent Document 2 is not suitable for use as an optical component in light guiding plates.

CITATION LIST

Patent Literature

[Patent Document 1] Japanese Unexamined Patent Application Publication No. Hei 4-164910
[Patent Document 2] Japanese Unexamined Patent Application Publication No. 2008-248221

SUMMARY OF INVENTION

Technical Problem

Accordingly, an objective of the present invention is directed to provide an acrylic composition, which has excellent flexibility at low temperature and can form a formed body whose adhesion at room temperature is suppressed, a formed body of the acrylic composition, a key sheet of a mobile telephone and a light guide obtained from the formed body.

Solution to Problem

The objective mentioned above is achieved by items [1], [2], [3] or [4] of the present invention.

[1] The first item of the present invention is an acrylic composition, which contains long-chain di(meth)acrylate (A) represented by Formula (1) and mono(meth)acrylate (B), and the glass-transformation temperature (TgDMS) of a polymer of the acrylic composition determined by using the following method is 40° C. or less.

[Chemical Formula 1]

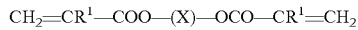

$$CH_2=CR^1-COO-(X)-OCO-CR^1=CH_2 \quad (1)$$

In the above Formula (1), (X) is a bivalent group having a number average molecular weight (Mn) of 500 or more and containing a repeating unit of a bivalent group formed by at least one diol selected from alkylene glycol, ester diol and carbonate diol with two OH groups removed, and $R^1$ is H or $CH_3$.

The method for determining the glass-transformation temperature (TgDMS) is as follows:

0.3 weight part of 1-hydroxy-cyclohexyl-phenyl-ketone as a photopolymerization initiator is added to 100 weight parts of the acrylic composition, and a deaeration treatment is performed at reduced pressure. The acrylic composition is injected into a mold including two glass plates disposed opposite to each other and disposed with an interval of 0.4 mm, and gasket. The acrylic composition in the mold is irradiated with an ultraviolet ray for 60 min at a peak intensity of 2.1 mW/cm² by using a chemical lamp to photopolymerize the acrylic composition and obtain a sheet-like material. A test piece having a thickness of 400 μm, a width of 6 mm, and a length of 50 mm is obtained from the sheet-like material. The dynamic viscoelasticity of the test piece is determined by using a dynamic viscoelasticity determination device (trade name: EXSTAR DMS6100, manufactured by SII Nano Technology (Inc.)), in a nitrogen atmosphere and under determination conditions of a frequency of 1 Hz, a temperature range of −50° C. to 150° C., and a heating rate of 2° C./min. A temperature of the maximum value as shown in a temperature-tan δ curve obtained form the results is the TgDMS.

[2] The second item of the present invention is a formed body, which is obtained by polymerizing an acrylic composition containing long-chain di(meth)acrylate (A) represented by Formula (1) and mono(meth)acrylate (B), and the glass-transformation temperature (TgDMS) of the polymer of the acrylic composition determined by using the following method is 40° C. or less.

[Chemical Formula 2]

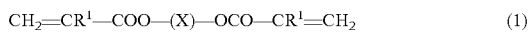

$$CH_2=CR^1-COO-(X)-OCO-CR^1=CH_2 \quad (1)$$

In the above Formula (1), (X) is a bivalent group having a number average molecular weight (Mn) of 500 or more and containing a repeating unit of a bivalent group formed by at least one diol selected from alkylene glycol, ester diol and carbonate diol with two OH groups removed, and $R^1$ is H or $CH_3$.

The method for determining the glass-transformation temperature (TgDMS) is as follows:

A test piece having a thickness of 400 μm, a width of 6 mm, and a length of 50 mm is obtained from the formed body. The dynamic viscoelasticity of the test piece is determined by using a dynamic viscoelasticity determination device (trade name: EXSTAR DMS6100, manufactured by SII Nano Technology (Inc.)), in a nitrogen atmosphere and under determination conditions of a frequency of 1 Hz, a temperature range of −50° C. to 150° C., and a heating rate of 2° C./min. A temperature of the maximum value in a temperature-tan δ curve obtained from the results is the TgDMS.

[3] The third item of the present invention is a key sheet of a mobile telephone obtained from the formed body.

[4] The fourth item of the present invention is a light guide obtained from the formed body.

Advantageous Effects of Invention

The formed body obtained from the acrylic composition through polymerization has excellent flexibility at low temperature, and the adhesion at room temperature is suppressed, so the optical properties are excellent. Therefore, the formed body is applicable in various optical components such as reflecting material used in Fresnel lens, polarizing film, polarizer protection film, phase difference film, light diffusion film, angle-of-view extending film, reflective film, antireflection film, antiglare film, brightness improving film, prism sheet, microlens array, conductive film for touch panel and road sign; and side light type guiding plate used in, for example, film for solar cell, mobile phone front surface protection film, mobile phone contrast enhance film, thin liquid crystal display, flat panel display, plasma display, flexible display, mobile phone display, mobile phone keypad lighting, personal computer keyboard lighting and advertising board.

DESCRIPTION OF EMBODIMENTS

The acrylic composition (sometimes referred to as "this composition" in the following) of the present invention contains long-chain di(meth)acrylate (A) (sometimes referred to as "component (A)" in the following) and mono(meth)acrylate (B) (sometimes refers to as "component (B)" in the following). In addition, in the present invention, "(meth)acrylate" refers to one or two of "acrylate" and "methacrylate".

[Component (A)]

The component (A) is a monomer for introducing a crosslink structure into the formed body to enable the flexibility at low temperature and the shape retention at high temperature to coexist. The component (A) may be used alone, or two or more components (A) may be used in combination. The component (A) contains a bivalent group (X), the bivalent group (X) contains a repeating unit of a bivalent group formed by at least one diol selected from alkylene glycol, ester diol and carbonate diol with two OH groups removed, and the bivalent group (X) has a number average molecular weight (Mn) of 500 or more.

The Mn of (X) in Formula (1) is preferably 500 to 10,000, more preferably 550 to 3,000, and further more preferably 600 to 1,500. When the Mn of (X) is 500 or more, the TgDMS of the polymer is decreased, so that the flexibility at low temperature of the formed body is good. In addition, in view of improving the transparency of the formed body, the Mn of (X) is preferably 10,000 or less. When the Mn of (X) is 550 to 3,000, more preferably 600 to 1,500, the flexibility at low temperature of the formed body is good, and a formed body with excellent transparency may be obtained.

(X) in Formula (1) may be, for example, a bivalent group formed by removing two OH groups from the following diols. The diol may be a polyalkylene glycol, for example, a monoalkylene glycol such as ethylene glycol, propylene glycol, butylene glycol, pentanediol, hexanediol, heptanediol, octanediol, nonanediol, decanediol and undecanediol, a polyethylene glycol in which the number of the repeating unit is 12 or more such as dodecaethylene glycol, trideca-ethylene glycol, tetradecaethylene glycol, pentadecaethylene glycol and hexadecaethylene glycol, a polypropylene glycol in which the number of the repeating unit is 9 or more such as nonapropylene glycol, decapropylene glycol, undecapropylene glycol, dodecapropylene glycol and tridecapropylene glycol, a polybutylene glycol in which the number of the repeating unit is 7 or more such as heptabutylene glycol, octabutylene glycol, nonabutylene glycol, decabutylene glycol and undecabutylene glycol; a polyester diol, namely, a product of a reaction between a low-molecular weight diol, such as the polyalkylene glycol, ethylene glycol, propylene glycol, butylene glycol, 1,5-pentanediol, 1,6-hexanediol and 1,4-cyclohexanedimethanol, and an acid component, for example, a dibasic acid such as adipic acid, succinic acid, phthalic acid, hexahydrophthalic acid, and terephthalic acid, or anhydride thereof; and a polycarbonate diol, namely, a product of a reaction between a diol such as the polyalkylene glycol and the low-molecular weight diol, and a carbonate such as dimethyl carbonate.

In view of making the flexibility at low temperature of the formed body to be good, (X) is preferably a bivalent group derived from a polyalkylene glycol. In addition, in view of decreasing the water absorption of the formed body, (X) is more preferably a bivalent group derived from a polybutylene glycol in which the number n of the repeating unit is 7 or more such as octabutylene glycol, nonabutylene glycol, decabutylene glycol, and undecabutylene glycol.

For the form of (X), repeating of a single structural unit or repeating of two or more structural units is acceptable. In addition, when the structure of (X) is repeating of two or more structural units, the arrangement of the structural units may be that the structural units exist randomly, the structural units exist in the form of blocks, or the structural units exist alternately.

Specific examples of the component (A) may include, for example, acryester PBOM (polybutylene glycol dimethacrylate, Mn of (X)=650) manufactured by Mitsubishi Rayon Co., Ltd., KPBM (dimethacrylate with polyester of 2-butyl-2-ethyl-1,3-propanediol and adipic acid as repeating unit, Mn of (X)=1800), Blemmer PDE-600 (polyethylene glycol dimethacrylate, n=14, Mn of (X)=616) manufactured by NOF CORPORATION, Blemmer PDP-700 (polypropylene glycol dimethacrylate, n=12, Mn of (X)=696), Blemmer PDT-650 (polybutylene glycol dimethacrylate, n=9, Mn of (X)=648), Blemmer 40PDC1700B (dimethacrylate of random copolymer of polyethylene glycol and polypropylene glycol, Mn of (X)=1,700) and Blemmer ADE-600 (polyethylene glycol diacrylate, n=14, Mn of (X)=616), NK Ester A-PTNG65 (polyethylene glycol diacrylate, n=9, Mn of (X)=600) manufactured by Shin-Nakamura Chemical Co., Ltd., NK Ester A-600 (polyethylene glycol diacrylate, n=14, Mn of (X)=600), NK Ester A-1000 (polyethylene glycol diacrylate, n=23, Mn of (X)=1,000), NK Ester APG-700 (polypropylene glycol diacrylate, n=12, Mn of (X)=700), NK Ester 14G (polyethylene glycol dimethacrylate, n=14, Mn of (X)=600) NK Ester 23G (polyethylene glycol dimethacrylate, n=23, Mn of (X)=1,000), and UH-100DM (polyhexane carbonate diol dimethacrylate, Mn of (X)=800) manufactured by Ube Industries Ltd. (all the names are trade names).

[Component (B)]

In the present invention, the component (B) is a monomer for imparting strength to the formed body. The component (B) is preferably such as a component that the glass-transformation temperature (TgFOX) (referred to as "TgFOX" in the following) of the polymer of the component (B) is 90° C. or less, and more preferably 40° C. or less. When the TgFOX of the component (B) is 90° C. or less, even when the content of the expensive component (A) in this composition is reduced, the TgDMS of this composition is 40° C. or less.

In addition, the TgFOX is calculated by the following Fox Equation using the glass-transformation temperatures of homopolymers of monomers that form the component (B) that are recorded in "Polymer Handbook (1999 edition)" (John Wiley & Sons Inc.).

$$1/TgFOX = W1/TgFOX1 + W2/TgFOX2 + \ldots + Wi/TgFOXi \quad (1)$$

In the mathematical equation, i is the number of monomers that form mono(meth)acrylate (B), W1, W2, . . . , and Wi are weight factions of the monomers in mono(meth) acrylate (B), and TgFOX1, TgFOX2, . . . , and TgFOXi are the glass-transformation temperatures (K) of homopolymers of the monomers.

The component (B) may be, for example, an alkyl (meth) acrylate such as methyl acrylate (TgFOX: 10° C.), methyl methacrylate (TgFOX: 105° C.), ethyl acrylate (TgFOX: −24° C.), ethyl methacrylate (TgFOX: 65° C.), n-propyl acrylate (TgFOX: −40° C.), n-propyl methacrylate (TgFOX: 35° C.), isopropyl acrylate (TgFOX: −6° C.), isopropyl methacrylate (TgFOX: 81° C.), n-butyl acrylate (TgFOX: −54° C.), n-butyl methacrylate (TgFOX: 20° C.), isobutyl acrylate (TgFOX: −24° C.), isobutyl methacrylate (TgFOX: 53° C.), tert-butyl acrylate (TgFOX: −23° C.), tert-butyl methacrylate (TgFOX: 118° C.), 2-ethylhexyl acrylate (TgFOX: −50° C.), 2-ethylhexyl methacrylate (TgFOX: −10° C.), lauryl acrylate (TgFOX: −3° C.), lauryl methacrylate (TgFOX: −65° C.), tridecyl acrylate, tetradecyl acrylate (TgFOX=−55° C. to −24° C.), tridecyl methacrylate, tetradecyl methacrylate (TgFOX: −73° C. to −13° C.), stearyl methacrylate (TgFOX: −100° C.), and dodecyl methacrylate; aryl (meth)acrylate such as phenyl acrylate (TgFOX: 57° C.), phenyl methacrylate (TgFOX: 110° C.), benzyl acrylate (TgFOX: 6° C.), and benzyl methacrylate (TgFOX: 54° C.); an alicyclic (meth)acrylate such as isobornyl acrylate (TgFOX: 94° C.), isobornyl methacrylate (TgFOX: 110° C.), cyclohexyl acrylate (TgFOX: 19° C.), cyclohexyl methacrylate (TgFOX: 83° C.), tert-butylcyclohexyl methacrylate (TgFOX: 83° C.), 1-adamantly acrylate (TgFOX: 153° C.), 1-adamantly methacrylate (TgFOX: 141° C.); and a heterocyclic (meth)acrylate such as glycidyl methacrylate (TgFOX: 46° C.). These components may be used alone, or two or more components may be used in combination.

In view of good adhesion at high temperature and good polymerization during photopolymerization, among these components, methacrylate is superior to acrylate. In addition, in view of good flexibility at low temperature of the formed body, among these components, methyl (meth)acrylate, n-butyl (meth)acrylate, methyl (meth)acrylate, tridecyl (meth)acrylate and tetradecyl (meth)acrylate are preferable, and methyl methacrylate, n-butyl methacrylate, tridecyl methacrylate and tetradecyl methacrylate are more preferable.

An example of using two or more monomers as the component (B) may be, for example, a mixed component (TgFOX: 57.1° C.) of 50 wt % methyl methacrylate and 50 wt % n-butyl methacrylate 50 wt %, and a mixed component (TgFOX: −35.2° C. to 2.5° C.) of 50 wt % mixture of tridecyl methacrylate and dodecyl methacrylate and 50 wt % n-butyl methacrylate.

Since the TgDMS of this composition is 40° C. or less, a formed body with excellent flexibility at low temperature may be obtained. The TgDMS of this composition is preferably 30° C. or less, and more preferably 20° C. or less.

In the present invention, the formed body with good flexibility at low temperature preferably has a storage elasticity modulus at −30° C. of 2,000 MPa or less.

In view of making the flexibility at low temperature of the formed body to be excellent, the content of the component (A) in this composition is preferably 5 wt % to 85 wt %, and more preferably 10 wt % to 85 wt %.

In view of making the embrittlement resistance and the strength of the formed body to be excellent, the content of the component (B) in this composition is preferably 15 wt % to 95 wt %, and more preferably 15 wt % to 90 wt %.

In the present invention, in order to improve the thickness precision of a coating using this composition through viscosity adjustment, improve the operability of this composition, or improve the transparency of the formed body, this composition may contain the polymers described below.

[Component (C)]

In the present invention, in view of maintaining the flexibility at low temperature of the formed body and improving the inhibition effect on the adhesion at room temperature and high temperature of the formed body, this composition preferably contains short-chain di(meth)acrylate (C) (referred to as "component (C)" in the following) represented by Formula 2.

[Chemical Formula 3]

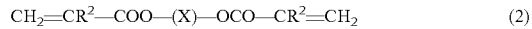

$$CH_2=CR^2-COO-(X')-OCO-CR^2=CH_2 \quad (2)$$

In the formula, (X') is a first bivalent group formed by at least one diol selected from alkylene glycol, ester diol and carbonate diol with two OH groups removed, or a second bivalent group having a number average molecular weight (Mn) of less than 500 and containing a repeating unit of the first bivalent group, and $R^2$ is H or $CH_3$.

(X') in Formula (2) may be, for example, a bivalent group formed by removing two OH groups from the following diols. The bivalent group may be a polyalkylene glycol, for example, a monoalkylene glycol such as ethylene glycol, propylene glycol, butylene glycol, pentanediol, hexanediol, heptanediol, octanediol, nonanediol, decanediol, and undecanediol; a polyethylene glycol in which the number of the repeating unit is 11 or less such as diethylene glycol, triethylene glycol, tetraethylene glycol, pentaethylene glycol, and hexaethylene glycol; a polypropylene glycol in which the number of the repeating unit is 8 or less such as dipropylene glycol, tripropylene glycol, tetrapropylene glycol, pentapropylene glycol, and hexapropylene glycol; and a polybutylene glycol in which the number of the repeating unit is 6 or less such as dibutylene glycol, tributylene glycol, tetrabutylene glycol, pentabutylene glycol, and hexabutylene glycol.

For the form of (X'), repeating of a single structural unit or repeating of two or more structural units is acceptable. In addition, when the structure of (X') is repeating of two or more structural units, the arrangement of the structural units may be that the structural units exist randomly, the structural units exist in the form of blocks, or the structural units exist alternately.

Specific examples of the component (C) may include, for example, propylene glycol dimethacrylate, 1,4-butylene glycol dimethacrylate, 1,6-hexanediol dimethacrylate, 1,3-butylene glycol dimethacrylate, dimethylolethane dimethacrylate, ethylene glycol di(meth)acrylate, diethylene glycol di(meth)acrylate, triethylene glycol di(meth)acrylate and dipropylene glycol dimethacrylate. The component (C) may be used alone, or two or more components (C) may be used in combination.

Based on 100 weight parts of the component (A) and the component (B) in total, the content of the component (C) in this composition is preferably 0.1 weight parts to 10 weight parts, and more preferably 0.5 weight part to 8 weight parts. When the content of the component (C) is 0.1 weight part or more, the inhibition effect on the adhesion at high temperature of the formed body is improved. In addition, when the content of the component (C) is 10 weight parts or less, the situation that the formed body gets embrittle and loses the flexibility at low temperature due to the increase of the crosslinking density is avoided.

In the present invention, preferably, methyl methacrylate, n-butyl methacrylate, dodecyl methacrylate, tridecyl methacrylate or tetradecyl methacrylate having a TgFOX of 90° C. or less, and preferably −30° C. to 40° C. is used as the component (B), and 1,3-butylene glycol dimethacrylate or 1,6-hexanediol dimethacrylate is used as the component (C). In this way, the content of the expensive component (A) may be reduced to 15 wt % to 40 wt %, the flexibility at low temperature of the formed body is maintained, and the adhesion at high temperature of the formed body is improved. Especially, more preferably, the content of the component (A) is 70 wt % to 20 wt %, the content of n-butyl methacrylate, tridecyl methacrylate or tetradecyl methacrylate used as the component (B) is 0 wt % to 80 wt % in total, and based on 100 weight parts of the component (A) and the component (B) in total, the content of the component (C) is 0.1 weight part to 10 weight parts.

[Polymer]

In the present invention, in order to improve the thickness precision of the formed body by adjusting the viscosity of this composition, and improve the operability of this composition or improve the transparency of the formed body, this composition may contain a polymer. The useful polymer may be, for example, a polymer that can be dissolved in at least one of the component (A) and the component (B).

Specific examples of the polymer may include, for example, a polymer obtained from a monomer as the component (A), a monomer as the component (B), and at least one monomer selected from monomers that are copolymerizable with the component (A) or the component (B).

The method for manufacturing the polymer may be, for example, suspension polymerization, emulsion polymerization and bulk polymerization. During polymerization, a chain transfer agent may be used. The chain transfer agent may be, for example, alkyl mercaptan such as n-butyl mercaptan, n-dodecyl mercaptan and n-octyl mercaptan, and α-methylstyrene dimer.

When this composition contains a polymer, a composition (D) containing monomers and polymers obtained through partial polymerization of at least monomer selected from the component (A) and the component (B) may be used.

The content of the component (A) in the monomer raw material for obtaining the composition (D) is preferably 1 wt % to 60 wt %, and more preferably 5 wt % to 30 wt %. If the content of the component (A) is 1 wt % or more, the intermiscibility of the polymer and the component (A) is good, and a formed body with good transparency may be obtained. In addition, if the content of the component (A) is 60 wt % or less, the crosslinking gelation of the polymers in the composition (D) may be inhibited, so that the fluidity of the composition (D) is good.

In addition, the content of the component (B) in the monomer raw material for obtaining the composition (D) is preferably 40 wt % to 99 wt %, and more preferably 70 wt % to 95 wt %. If the content of the component (B) is 99 wt % or less, the intermiscibility of the polymer and the component (B) is good, and a formed body with good transparency may be obtained. In addition, if the content of the component (B) is 40 wt % or more, the crosslinking gelation of the polymers in the composition (D) may be inhibited, so that the fluidity of the composition (D) is good.

In the present invention, the content of the polymers in the composition (D) is preferably 5 wt % to 50 wt %, more preferably 10 wt % to 40 wt %. When the content of the polymer is 5 wt % or more, the viscosity of the composition (D) is at a suitable level, and when the content of the polymer is 50 wt % or less, crosslinking gelation of the polymer can be inhibited, so as to manufacture a formed body with high transparency.

In the present invention, in order to obtain the composition (D), the useful monomer may contain a polymerization initiator (β). The polymerization initiator (β) may be, for example, an organic peroxide polymerization initiator such as benzoyl peroxide, lauroyl peroxide, tert-butyl peroxyisobutyrate, tert-butyl peroxy-2-ethylhexanoate, tert-butyl peroxyneodecanoate, tert-hexyl peroxypivalate, diisopropyl peroxydicarbonate, and bis(4-tert-butylcyclohexyl) peroxydicarbonate; and 2,2'-azobisisobutyronitrile, 2,2'-azobis(2,4-dimethylvaleronitrile), and 2,2'-azobis(4-methoxy-2,4-dimethylvaleronitrile).

In view of preventing crosslinking gelation of the polymer, based on 100 weight parts of the monomer components used for obtaining the composition (D), the amount of the polymerization initiator (β) is preferably 0.001 weight part to 5 weight parts, more preferably 0.005 weight part to 1 weight part, and further more preferably 0.01 weight part to 0.1 weight part.

When a composition (D) containing monomers and polymers is obtained, in order to prevent crosslinking gelation of the polymer, a chain transfer agent may be optionally added to the monomer raw material. The chain transfer agent may be, for example, alkyl mercaptan such as n-butyl mercaptan, n-dodecyl mercaptan and n-octyl mercaptan, and α-methylstyrene dimer.

Based on 100 weight parts of the monomer components, the content of the chain transfer agent is preferably 0.01 weight part to 10 weight parts, more preferably 0.1 weight part to 5 weight parts, and further more preferably 0.2 weight part to 0.5 weight part. When the content of the chain transfer agent is 0.01 weight part or more, crosslinking gelation of the polymer may be inhibited. In addition, when the content of the chain transfer agent is 10 weight parts or less, the viscosity of the composition (D) may be at a suitable level.

In the present invention, in order to prevent coloring or natural hardening of the composition (D) containing monomers and polymers, a polymerization inhibitor may be optionally added to the monomer raw material. The polymerization inhibitor may be, for example, hydroquinone, hydroquinone monomethyl ether, 2,6-di-tert-butyl-4-methylphenol and 2,4-dimethyl-6-tert-butylphenol. These polymerization inhibitors may be used alone, or two or more polymerization inhibitors may be used in combination.

The method for manufacturing the composition (D) containing monomers and polymers may be, for example, the following methods.

In a method, a monomer mixture containing the component (A) and the component (B) is partially polymerized, to obtain a syrup composition (D).

In another method, to a syrup formed by partial polymerization of a monomer mixture (m1) containing at least one selected from the component (A) and the component (B), a monomer mixture (m2) containing at least one selected from the component (A) and the component (B) that serves as a remaining monomer component required for this composition is added and dissolved, to obtain a syrup composition (D).

Specific examples of the method for manufacturing the composition (D) may be, for example, the following method: monomer raw materials are added to a reactor equipped with a condenser tube, a thermometer and a mixer, and are heated with stirring; a polymerization initiator is added when the temperature reaches a preset value; the temperature in the reactor is maintained for a preset time; and the reactor is rapidly cooled to room temperature through vacuum cooling, so as to stop polymerization.

The viscosity of this composition is preferably 100 mPa·s to 5,000 mPa·s. When the viscosity of this composition is 100 mPa·s or more, after a coating of this composition is continuously formed on a continuous sheet-like material, this composition that forms the continuous coating is polymerized through heating or active energy ray irradiation to manufacture the formed body, so that high thickness precision can be obtained. In addition, when the viscosity of this composition is 5,000 mPa·s or less, the intermiscibility of the components of this composition is at a suitable level, and a formed body with high transparency may be manufactured. In addition, when the composition (D) is used as this composition, and when the viscosity of this composition is 5,000 mPa·s or less, crosslinking gelation of the polymers in the composition (D) may be inhibited, and a formed body with high transparency may be manufactured.

[Polymerization Initiator (α)]

The polymerization initiator (α) for polymerizing this composition to form a formed body may be, for example, a thermal polymerization initiator or a photopolymerization initiator used in thermal polymerization or active energy polymerization. The thermal polymerization initiator may be, for example, a polymerization initiator the same as the polymerization initiator (β).

The photopolymerization initiator may be, for example, 1-hydroxy-cyclohexyl phenyl ketone, 2-hydroxy-2-methyl-1-phenyl-propane-1-one, methyl phenylglyoxylate, acetophenone, benzophenone, diethoxyacetophenone, 2,2-dimethoxy-2-phenylacetophenone, 1-phenyl-1,2-propane-dione-2-(o-ethoxycarbonyl)oxime, 2-methyl[4-(methylthio)phenyl]-2-morpholinyl-1-propanone, benzil, benzoin methyl ether, benzoin ethyl ether, benzoin isopropyl ether, benzoin isobutyl ether, 2-cholothioxanthone, isopropyl thioxanthone, 2,4,6-trimethylbenzoyldiphenylphosphine oxide, benzoyldiphenylphosphine oxide, 2-methylbenzoyldiphenylphosphine oxide and benzoyldimethoxyphosphine oxide. These photopolymerization initiators may be used along, or two or more photopolymerization initiators may be used in combination.

Based on 100 weight parts of this composition, the content of the polymerization initiator (a) is preferably 0.005 weight part to 5 weight parts, more preferably 0.01 weight part to 1 weight part, and further more preferably 0.05 weight part to 0.5 weight part. If the content of the polymerization initiator (a) is 5 weight parts or less, coloring of the formed body may be inhibited. In addition, if the content of the polymerization initiator (a) is 0.005 weight part or more, the polymerization time is suitable and will not be excessively long.

In the present invention, a thermal polymerization initiator and a photopolymerization initiator may be optionally used in combination as the polymerization initiator (α).

In the present invention, a release agent may be optionally formulated in the acrylic composition. Based on 100 weight parts of this composition, the amount of the release agent formulated is preferably 0.005 weight part to 0.5 weight part. If the amount of the release agent formulated is 0.005 weight part or more, the release performance of the obtained formed body is good when being stripped off from a sheet-like material such as a polyethylene terephthalate (PET) film or stainless steel plate as a mold. In addition, if the amount of the release agent formulated is 0.5 weight part or less, the water absorption or surface condition of the formed body are good.

The release agent may be, for example, A-OT (trade name, bis(2-ethylhexyl) sulfosuccinate sodium salt) manufactured by Mitsui Scitex and JP-502 (trade name, a mixture of biethyl phosphate and monoethyl phosphate at a ratio of 55:45) manufactured by JOHOKU CHEMICAL Co., Ltd.

In the present invention, various additives such as a lubricant, a plasticizer, an antibacterial agent, an anti-mildew agent, a light stabilizer, a ultraviolet absorbent, a bluing agent, a dye, an antistatic agent, and a heat stabilizer may be added to this composition according to different purposes.

[Formed Body]

The formed body is obtained by polymerizing this composition. The formed body may be, for example, a plate body such as a film-like materials or sheet-like materials, fiber and porous body.

The storage elasticity modulus at −30° C. of the formed body is preferably 2,000 MPa or less, and more preferably 1,500 MPa or less. When the storage elasticity modulus at −30° C. of the formed body is 2,000 MPa or less, the flexibility at low temperature of the formed body is good.

The storage elasticity modulus at 80° C. of the formed body is preferably 8 MPa or more, and more preferably 10 MPa or more. When the storage elasticity modulus at 80° C. of the formed body is 8 MPa or more, the adhesion at normal temperature and high temperature may be inhibited.

In the present invention, when the formed body is subjected to a tensile test at 25° C. and 500 mm/min by using a dumbbell-shaped) 1# test piece according to JIS K6251, the elongation at break of the formed body is preferably 10% or more, more preferably 30% or more. When the elongation at break of the formed body is 10% or more, and when the formed body is manufactured as a film-like material, break of the film-like material during operation is inhibited, and when the film-like material is continuously manufactured, the film-like material may be recovered by being wound on a roll such as a paper tube and a plastic core.

In the present invention, when the formed body is cut a width and a length of 5 cm and is detected by using a NDH2000 (manufactured by Nippon Denshoku Industries Co., Ltd., trade name) according to JIS K7105, the haze value is preferably 1% or less, and more preferably 0.5% or less. The formed body with a haze value of 1% or less can be suitable for use as an optical component.

The optical component may be, for example, reflecting materials used in Fresnel lens, polarizing film, polarizer protection film, phase difference film, light diffusion film, angle-of-view extending film, reflective film, antireflection film, antiglare film, brightness improving film, prism sheet, microlens array, conductive film for touch panel and road signs; and side light type light guiding plate used in, for example, film for solar cell, mobile phone front surface protection film, mobile phone contrast enhance film, thin liquid crystal display, flat panel display, plasma display, flexible display, mobile phone display, mobile phone keypad lighting, personal computer keyboard lighting and advertising board.

The thickness of the formed body is preferably 1000 μm or less, more preferably 500 μm or less, further more preferably 10 μm to 500 μm, and most preferably 25 μm to 400 μm. The formed body having a thickness of 1000 μm or less can be suitable for use as an optical component, especially as a thin light guiding plate.

The method for manufacturing the formed body may be, for example, the following method: a composition is injected to a mold obtained by inserting gasket between two sheet-like materials such as glass plates and films to form a coating of this composition, and then this composition in the mold is polymerized by irradiating active energy ray or heating from a single side or two sides of the mold, and the resulting formed body is stripped from the mold.

The sheet-like material may be, for example, a polyethylene terephthalate (PET) film and a stainless steel plate. In view of the smoothness of the surface of the formed body, the PET film is preferably a PET film with excellent surface smoothness. Specific examples of the PET film may include, for example, Toyobo ester film E5001 (manufactured by Toyobo Co., Ltd., trade name), Cosmoshine A4100 (manufactured by Toyobo Co., Ltd., trade name) and Lumirror T60 (manufactured by Toray Industries Ltd., trade name).

The active energy ray used for irradiation during polymerization of this composition may be, for example, visible light, ultraviolet ray, infrared ray, X ray, $\alpha$ ray, $\beta$ ray, electron beam and $\gamma$ ray. In view of safety during manufacturing or cost of polymerization unit, among these active energy rays, visible light and ultraviolet ray are preferably.

In addition, the method for manufacturing the formed body may be, for example, the following method: a continuous sheet-like material is used to form a mold; a continuous coating of this composition is formed on the continuous sheet-like material to manufacture the formed body. The continuous sheet-like material may be, for example, a continuous sheet-like material having a thickness of 0.01 mm to 3 mm. Specific examples of the manufacturing method may include the following methods.

First, this composition is supplied onto a stainless steel belt to form a continuous coating of this composition, and then a film transferred in the same direction and at the same speed with the stainless steel belt is laminated on a surface of the continuous coating to form a laminated body. The resulting laminated body is heated or irradiated with active energy ray to polymerize this composition, so as to form a formed body. Next, the film is continuously stripped off, and the resulting formed body is continuously stripped off from the stainless steel belt, so as to make the formed body separated.

The continuously manufactured formed body may be recovered by being wound on a roll such as a paper tube and a plastic core. The formed body of the present invention is especially useful in a key sheet of a mobile telephone or a light guide.

The formed body of the present invention may be used in the manner that at least one surface of the formed body has a laminated body of a resin layer containing a thermoplastic resin or a crosslinking resin laminated thereon, without damaging the flexibility. The thermoplastic resin may include, for example, acrylic resin, polycarbonate resin, polyamide resin, polystyrene resin, polyvinyl chloride resin, polyester resin, and polyolefin resin; and the crosslinking resin may include, for example, a copolymer of mono(meth) acrylate and a monomer that has two or more free polymerizable unsaturated groups in the molecule.

EXAMPLES

In the following, the present invention is described with examples. In addition, the acrylic composition and the formed body are evaluated by the method below. Additionally, "part" in the following represents "weight part".

(1) TgDMS of Polymer 0.3 part of 1-hydroxy-cyclohexyl-phenyl-ketone as a photopolymerization initiator is added to 100 parts of the acrylic composition. Two glass plates having a length of 300 mm, a width of 300 mm and a thickness of 6 mm and polyvinyl chloride gasket having a thickness of about 0.4 mm are prepared, and the two glass plates that face each other are disposed with an interval of 0.4 mm and the gasket is disposed around the glass plates to form a mold. The acrylic composition after deaeration treatment at reduced pressure is injected into the formed mold.

The acrylic composition in the mold is irradiated with ultraviolet ray for 60 min at a peak intensity of 2.1 mW/cm$^2$ by using a chemical lamp (manufactured by Toshiba Lighting & Technology Corp., trade name: FL20SBL) to photopolymerize the acrylic composition. Next, the mold is cooled to room temperature, the glass plates and the gasket that form the mold are removed to manufacture a sheet-like polymer having a thickness of 400 μm, thereby obtaining a "test piece 1 having a width of 6 mm and a length of 50 mm. The dynamic viscoelasticity of the test piece is determined by using a dynamic viscoelasticity determination device (trade name: EXSTAR DMS6100, manufactured by SII Nano Technology (Inc.)), in a nitrogen atmosphere and under determination conditions of a frequency of 1 Hz, a temperature range of −50° C. to 150° C., and a heating rate of 2° C./min, and the temperature of the maximum value as shown in temperature-tan δ curve is used as the TgDMS of the polymer.

(2) TgFOX of Component (B)

TgFOX of the polymer of the component (B) (TgFOX of the component (B)) is calculated by the following Fox Equation using the glass-transformation temperatures of homopolymers of monomers that form the component (B) that are recorded in "Polymer Handbook (1999 edition)" (John Wiley & Sons Inc.).

$$1/TgFOX = W1/TgFOX1 + W2/TgFOX2 + \ldots + Wi/TgFOXi \quad \text{[Mathematical Equation 2]}$$

In the mathematical equation, i is the number of monomers that form mono(meth)acrylate (B), W1, W2, . . . , and Wi are weight factions of the monomers in mono(meth) acrylate (B), and TgFOX1, TgFOX2, . . . , and TgFOXi are the glass-transformation temperatures (K) of homopolymers of the monomers.

(3) Storage Elasticity Modulus

The storage elasticity modulus is detected under the same operation conditions by using a "test piece 1" the same as that is used in the detection of TgDMS.

(4) Adhesion

A PET film (having a thickness of 50 μm, Ra=0.21 μm) (manufactured by Toray Industries Ltd., trade name: Lumirror E6SR) cut into a width and a length of 5 cm is attached on a glass plate. The formed body having an average thickness of about 400 μm is cut into a width and a length of 4 cm, the formed body is placed on the PET film, and the obtained laminated body is used as a "test piece 2".

The test piece 2 is stood still for 1 hr at room temperature (23° C.), the adhesion of the formed body and the PET film is visually evaluated according to the following standard, and serves as the adhesion at room temperature. In addition, another test piece 2 that is obtained in the same manner is stood still for 24 hrs in a drying machine, the adhesion of the formed body and the PET film is visually evaluated according to the following standard, and serves as the adhesion at 85° C.

A: no adhesion of the formed body and the PET film is observed.
B: adhesion is observed at a part less than a half of the contact area of the formed body and the PET film.
C: adhesion is observed at a part greater than a half of the contact area of the formed body and the PET film.

(5) Elongation at Break

According to JIS K6251, 5 pieces of "test piece 3" of dumbbell-shaped 1# formed body are fabricated by using Super DumbBell Cutter (manufactured by DumbBell Co., Ltd., SDK-100D (trade name)). The resulting test piece 3 is subjected to a tensile test 5 times at room temperature 25° C. and a tensile speed of 500 mm/min by using Tensilon (manufactured by Orientec Co., Ltd., trade name), and the average value of the resulting values is used as the elongation at break.

(6) Total Light Transmittance

According to JIS K7361-1, the total light transmittance of the formed body that has an average thickness of about 400 μm and has been cut into a width and a length of 5 cm is detected by using NDH2000 (manufactured by Nippon Denshoku Industries Co., Ltd., trade name).

(7) Haze Value

According to JIS K7105, the haze value of the formed body that has an average thickness of about 400 μm and has been cut into a width and a length of 5 cm is detected by using NDH2000 (manufactured by Nippon Denshoku Industries Co., Ltd., trade name).

(8) YI Value

According to JIS K7105, the YI value of the formed body that has an average thickness of about 400 μm and has been cut into a width and a length of 5 cm is detected by using a spectroscopic color-difference meter SE-2000 (manufactured by Nippon Denshoku Industries Co., Ltd., trade name).

Example 1

80 parts of polybutylene glycol dimethacrylate (manufactured by Mitsubishi Rayon Co., Ltd., Mn of (X)=650, trade name: Acryester PBOM) as long-chain di(meth)acrylate (A), 20 parts of methyl methacrylate (manufactured by Mitsubishi Rayon Co., Ltd., TgFOX: 105° C., trade name: Acryester M) as mono(meth)acrylate (B), 0.3 part of 1-hydroxy-cyclohexyl-phenyl-ketone as polymerization initiator (α), and 0.05 part (500 ppm) of bis(2-ethylhexyl) sulfosuccinate sodium salt as stripping agent were mixed to obtain an acrylic composition.

On another hand, two glass plates having a length of 300 mm, a width of 300 mm and a thickness of 6 mm, and a polyvinyl chloride gasket having a thickness of about 0.4 mm were prepared. The two glass plates were disposed opposite to each other with an interval of 0.4 mm and the gasket was disposed around the glass plates, to form a mold. After deaeration treatment at reduced pressure, the acrylic composition was injected into the formed mold.

The acrylic composition in the mold was irradiated with ultraviolet ray for 60 min at a peak intensity of 2.1 mW/cm$^2$ by using a chemical lamp (manufactured by Toshiba Lighting & Technology Corp., trade name: FL20SBL) to photo-polymerize the acrylic composition. Next, the mold was cooled to room temperature, the glass plates and the gasket that formed the mold were removed to manufacture a sheet-like polymer having an average thickness of about 400 μm. The evaluation results are shown in Table 1.

Example 2 to Example 14 and Comparative Example 1

Expect that the components of the acrylic composition were set to the components shown in Table 1 or Table 2, a formed body having an average thickness of about 400 μm was obtained in the same manner as that in Example 1. The evaluation results are shown in Table 1 or Table 2. In addition, in Example 6 to Example 14, an acrylic composition containing short-chain di(meth)acrylate (C) was used. Additionally, the abbreviations of the component (A), the component (B) and the component (C) in Table 1 or Table 2 are compounds shown in Table 3.

Example 15

In this example, a composition containing monomers and polymers was used as acrylic composition.

7 parts of Acryester PBOM, 91 parts of n-butyl methacrylate and 0.3 part of n-octyl mercaptan (manufactured by Kanto Chemical Co., Inc.) as chain transfer agent were added to a reactor equipped with a condenser tube, a thermometer and a mixer, and were heated with stirring. A solution obtained by dissolving 0.08 part of 2,2'-azobis(2,4-dimethylvaleronitrile) (manufactured by Wako Pure Chemical Industries, trade name: V-65) as polymerization initiator in 2 parts of n-butyl methacrylate was added into the reactor when the temperature in the reactor reached 90° C. After addition of the polymerization initiator, heating was stopped, and the reactor was maintained at the temperature for 60 min. Then, the reactor was rapidly cooled to room temperature by using a large amount of ice water, to obtain a composition containing monomers and polymers in which the monomer were partially polymerized (the rate of polymerization was 25%).

In 75.27 parts of the resulting composition (polymer solution), 24.73 parts of Acryester PBOM were dissolved, and then 5 parts of 1,3-butylene glycol dimethacrylate were further dissolved to obtain a composition (D-1) (the viscosity was 350 mPa·s).

0.3 part of 1-hydroxy-cyclohexyl-phenyl-ketone as polymerization initiator (β) and 0.05 part (500 ppm) of bis(2-ethylhexyl) sulfosuccinate sodium salt as stripping agent were added to 105 parts of the composition (D-1) to obtain an acrylic composition containing polymers. The monomer components of the raw material of the acrylic composition containing polymers include 30 parts of Acryester PBOM, 70 parts of n-butyl methacrylate and 5 parts of 1,3-butylene glycol dimethacrylate.

Expect that an acrylic composition was used, a formed body having an average thickness of about 400 μm was obtained in the same manner as that in Example 1. The evaluation results are shown in Table 2.

Example 16

Expect that a composition (D-2) (the viscosity was 400 mPa·s) obtained by dissolving 35.48 parts of Acryester PBOM and 5 parts of 1,3-butylene glycol dimethacrylate in 64.52 parts of a composition (the rate of polymerization was 25%) containing monomers and polymers was used, a formed body having an average thickness of about 400 μm was obtained in the same manner as that in Example 15. The evaluation results are shown in Table 2. The monomer components of the raw material of the acrylic composition containing polymers include 40 parts of Acryester PBOM, 60 parts of n-butyl methacrylate and 5 parts of 1,3-butylene glycol dimethacrylate.

TABLE 1

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| Components of acrylic composition (parts) | Component (A) | PBOM | 80 | 45 | 30 | 10 | 40 | 30 | — | — | — |
|  |  | PBOA | — | — | — | — | 40 | — | 30 | — | — |
|  |  | KPBM | — | — | — | — | — | — | — | 30 | — |
|  |  | PCD-DM | — | — | — | — | — | — | — | — | 30 |
|  | Component (B) | MMA | 20 | — | 25 | — | 20 | — | — | — | — |
|  |  | BMA | — | 55 | — | 45 | — | 70 | 70 | 70 | 70 |
|  |  | SLMA | — | — | 45 | 45 | — | — | — | — | — |
|  | Component (C) | 1,3-BD | — | — | — | — | — | 1 | 1 | 1 | 1 |
|  |  | HWMA | — | — | — | — | — | — | — | — | — |
|  |  | 3ED | — | — | — | — | — | — | — | — | — |
| Evaluation results | TgDMS (° C.) of polymer |  | 3.9 | 7.9 | 12 | 4.5 | −18.9 | 27.6 | 11.9 | 36.7 | 38.5 |
|  | TgFOX (° C.) of component (B) |  | 105 | 20 | −1.1 | −20 | 105 | 20 | 20 | 20 | 20 |
|  | Storage elasticity modulus (MPa) | −30° C. | 1120 | 1290 | 1340 | 1030 | 318 | 1819 | 1401 | 1928 | 1960 |
|  |  | 80° C. | 43.1 | 14.2 | 7.9 | 0.018 | 36.5 | 10.6 | 8.3 | 4.7 | 8.5 |
|  | Adhesion | room temperature | A | A | A | B | A | A | A | A | A |
|  |  | 85° C. | A | A | C | C | A | A | A | A | A |
|  | Elongation at break (%) |  | 35 | 69 | 79 | 135 | 22 | 84 | 77 | 98 | 53 |
|  | Total light transmittance (%) |  | 92.7 | 92.6 | 92.8 | 92.5 | 92.7 | 92.6 | 92.8 | 92.8 | 92.8 |
|  | Haze value (%) |  | 0.2 | 0.1 | 0.1 | 0.8 | 0.4 | 0.5 | 0.9 | 1 | 0.8 |
|  | YI value (—) |  | 0.41 | 0.31 | 0.22 | 0.25 | 0.92 | 0.48 | 0.8 | 0.57 | 0.72 |

TABLE 2

|  |  |  | Example 10 | Example 11 | Example 12 | Example 13 | Example 14 | Example 15 | Example 16 | Comparative Example 1 |
|---|---|---|---|---|---|---|---|---|---|---|
| Components of acrylic composition (parts) | Component (A) | PBOM | 30 | 40 | 20 | 20 | 20 | 30 | 40 | 60 |
|  |  | PBOA | — | — | — | — | — | — | — | — |
|  |  | KPBM | — | — | — | — | — | — | — | — |
|  |  | PCD-DM | — | — | — | — | — | — | — | — |
|  | Component (B) | MMA | — | — | — | — | — | — | — | — |
|  |  | BMA | 70 | 60 | 40 | 40 | 40 | 70 | 60 | 40 |
|  |  | SLMA | — | — | 40 | 40 | 40 | — | — | — |
|  | Component (C) | 1,3-BD | 7.5 | 7.5 | 5 | — | — | 5 | 5 | — |
|  |  | HWMA | — | — | — | 5 | — | — | — | — |
|  |  | 3ED | — | — | — | — | 5 | — | — | — |
| Evaluation results | TgDMS (° C.) of polymer |  | 38.1 | 29 | 13.2 | 9.9 | 7.9 | 33.3 | 25.4 | 45 |
|  | TgFOX (° C.) of component (B) |  | 20 | 20 | −20 | −20 | −20 | 20 | 20 | 105 |
|  | Storage elasticity modulus (MPa) | −30° C. | 1941 | 1898 | 714 | 823 | 1003 | 1571 | 1453 | 2290 |
|  |  | 80° C. | 11.4 | 17.5 | 7.2 | 6.8 | 7.2 | 11.1 | 16.4 | 26.2 |
|  | Adhesion | room temperature | A | A | A | A | A | A | A | A |
|  |  | 85° C. | A | A | A | A | A | A | A | A |
|  | Elongation at break (%) |  | 68 | 62 | 74 | 57 | 66 | 70 | 64 | 58 |
|  | Total light transmittance (%) |  | 92.7 | 92.8 | 92.8 | 92.9 | 92.9 | 92.5 | 92.5 | 92.7 |
|  | Haze value (%) |  | 0.1 | 0.1 | 0.3 | 0.1 | 0.2 | 1 | 0.5 | 0.2 |
|  | YI value (—) |  | 0.56 | 0.6 | 0.49 | 0.5 | 0.59 | 0.51 | 0.54 | 0.64 |

TABLE 3

| Abbreviation | Compound name and/or trade name |
|---|---|
| PBOM | polybutylene glycol dimethacrylate (manufactured by Mitsubishi Rayon Co., Ltd., Mn of (X) = 650, trade name: Acryester PBOM) |
| PBOA | polytetramethylene glycol diacrylate (manufactured by Shin-Nakamura Chemical Co., Ltd., Mn of (X) = 650, trade name: NK Ester A-PTNG65) |
| KPBM | dimethacrylate (Mn of (X) = 1800) with polyester of 2-butyl-2-ethyl-1,3-propylene glycol and adipic acid as repeating unit |
| PCD-DM | polyhexane carbonate diol dimethacrylate (manufactured by Ube Industries Ltd., Mn of (X) = 800, trade name: UH-100DM) |
| MMA | methyl methacrylate (manufactured by Mitsubishi Rayon Co., Ltd., TgFOX: 105° C., trade name: Acryester M) |
| BMA | n-butyl methacrylate (manufactured by Mitsubishi Rayon Co., Ltd., TgFOX: 20° C., trade name: Acryester B) |
| SLMA | mixture (manufactured by Mitsubishi Rayon Co., Ltd., TgFOX: −60° C., trade name: Acryester SL) of tridecyl methacrylate and dodecyl methacrylate |
| 1,3-BD | 1,3-butylene glycol dimethacrylate (manufactured by Mitsubishi Rayon Co., Ltd., trade name: Acryester BD) |
| HXMA | 1,6-hexylene glycol dimethacrylate (manufactured by Mitsubishi Rayon Co., Ltd., trade name: Acryester HX) |
| 3ED | triethylene glycol dimethacrylate (manufactured by Mitsubishi Rayon Co., Ltd., trade name: Acryester 3ED) |

The evaluation results indicate that, the flexibility at low temperature of the formed bodies in Example 1 to Example 16 is good, and the adhesion at room temperature is good. In addition, for the Examples that the storage elasticity modulus at 80° C. of the formed body is 8 MPa or more, the adhesion at high temperature is also good. Additionally, even the storage elasticity modulus at 80° C. of the formed body is less than 8 MPa, the adhesion at high temperature of the formed body obtained from the acrylic composition contain the short-chain component (C) as crosslinking agent is also good to crosslink structure formed.

In contrast, the flexibility at low temperature of the formed body of Comparative Example 1 in which the glass-transformation temperature TgDMS of the polymer of the acrylic composition is 40° C. or more is poor.

INDUSTRIAL APPLICABILITY

The acrylic composition of the present invention can be used as an optical material, so as to provide a formed body such as a key sheet of a mobile telephone and a light guide.

The invention claimed is:
1. An acrylic composition, comprising:
a long-chain di(meth)acrylate (A) represented by Formula (1):

$$CH_2=CR^1-COO-(X)-OCO-CR^1=CH_2 \qquad (1); \text{ and}$$

a mono(meth)acrylate (B) comprising at least one selected from the group consisting of methyl (meth)acrylate, n-butyl (meth)acrylate, tridecyl (meth)acrylate and tetradecyl (meth)acrylate,
wherein, in the Formula (1), (X) is a bivalent group having a number average molecular weight (Mn) of 500 or more and comprising a repeating unit of a bivalent group formed by removing two OH groups from at least one diol selected from the group consisting of ester diol and carbonate diol, and $R^1$ is H or $CH_3$, and
a glass-transformation temperature (TgDMS) of a polymer of the acrylic composition is 40° C. or less, where the glass-transformation temperature (TgDMS) is a temperature of a maximum value of a temperature-tan δ curve obtained by adding 0.3 weight part of 1-hydroxy-cyclohexyl-phenyl-ketone as a photopolymerization initiator to 100 weight parts of the acrylic composition and performing deaeration treatment at reduced pressure, injecting the acrylic composition into a mold comprising a gasket and two glass plates disposed opposite to each other with an interval of 0.4 mm, irradiating the acrylic composition in the mold with an ultraviolet ray for 60 min at a peak intensity of 2.1 mW/cm² by using a chemical lamp to photopolymerize the acrylic composition and obtain a sheet-like material, obtaining a test piece having a thickness of 400 μm, a width of 6 mm, and a length of 50 mm from the sheet-like material, and determining a dynamic viscoelasticity of the test piece by using a dynamic viscoelasticity determination, in a nitrogen atmosphere and under determination conditions of a frequency of 1 Hz, a temperature range of −50° C. to 150° C., and a heating rate of 2° C./min.

2. The acrylic composition according to claim 1, wherein a glass-transformation temperature (TgFOX) of the polymer of the mono(meth)acrylate (B) is 90° C. or less, and the glass-transformation temperature (TgFOX) is calculated by Fox Equation:

$$1/TgFOX=W1/TgFOX1+W2/TgFOX2+\ldots+Wi/TgFOXi,$$

where i is a number of monomers forming the mono (meth)acrylate (B), W1, W2, . . . , and Wi are weight factions of the monomers in the mono(meth)acrylate (B), and TgFOX1, TgFOX2, . . . , and TgFOXi are glass-transformation temperatures (K) of homopolymers of the monomers.

3. The acrylic composition according to claim 2, further comprising a short-chain di(meth)acrylate (C) represented by Formula (2):

$$CH_2=CR^2-COO-(X')-OCO-CR^2=CH_2 \qquad (2),$$

where (X') is a first bivalent group formed by removing two OH groups from at least one diol selected from the group consisting of alkylene glycol, ester diol, and carbonate diol, or a second bivalent group having a number average molecular weight (Mn) of less than 500 and comprising a repeating unit of the first bivalent group, and $R^2$ is H or $CH_3$.

4. A formed body, obtained by a process comprising polymerizing the acrylic composition of claim 1,
wherein the formed body has a glass-transformation temperature (TgDMS) of 40° C. or less, and the glass-transformation temperature (TgDMS) of the formed body is a temperature of a maximum value of a temperature-tan δ curve obtained by adding 0.3 weight part of 1-hydroxy-cyclohexyl-phenyl-ketone as a photopolymerization initiator to 100 weight parts of the acrylic composition and performing deaeration treatment at reduced pressure, injecting the acrylic composition into a mold comprising a gasket and two glass plates disposed opposite to each other with an interval of 0.4 mm, irradiating the acrylic composition in the mold with an ultraviolet ray for 60 min at a peak intensity of 2.1 mW/cm² by using a chemical lamp to photopolymerize the acrylic composition and obtain a sheet-like material, obtaining a test piece having a thickness of 400 μm, a width of 6 mm, and a length of 50 mm from the formed body, and determining a dynamic viscoelasticity of the test piece by using a dynamic viscoelasticity determination device, in a nitrogen atmosphere and under determination conditions of a frequency of 1 Hz, a temperature range of −50° C. to 150° C., and a heating rate of 2° C./min.

5. The formed body according to claim 4, wherein the acrylic composition further comprises a short-chain di(meth)acrylate (C) represented by Formula (2):

$$CH_2=CR^2-COO-(X')-OCO-CR^2=CH_2 \qquad (2),$$

where (X') is a first bivalent group formed by removing two OH groups from at least one diol selected from the group consisting of alkylene glycol, ester diol, and carbonate diol, or a second bivalent group having a number average molecular weight (Mn) of less than 500 and comprising a repeating unit of the first bivalent group, and $R^2$ is H or $CH_3$.

6. The formed body according to claim 4,
wherein a storage elasticity modulus at −30° C. of the formed body is 2,000 MPa or less.

7. The formed body according to claim 4,
wherein a storage elasticity modulus at 80° C. of the formed body is 8 MPa or more.

8. The formed body according to claim 6,
wherein a storage elasticity modulus at 80° C. of the formed body is 8 MPa or more.

9. A key sheet of a mobile telephone, comprising the formed body of claim 4.

10. A key sheet of a mobile telephone, comprising the formed body of claim 6.

11. A key sheet of a mobile telephone, comprising the formed body of claim 7.

12. A key sheet of a mobile telephone, comprising the formed body of claim 8.

13. A light guide, comprising the formed body of claim 4.

14. A light guide, comprising the formed body of claim 6.

15. A light guide, comprising the formed body of claim 7.

16. A light guide, comprising the formed body of claim 8.

17. The acrylic composition according to claim 3, wherein the short-chain di(meth)acrylate (C) is at least one selected from the group consisting of propylene glycol dimethacrylate, 1,4-butylene glycol dimethacrylate, 1,6-hexanediol dimethacrylate, 1,3-butylene glycol dimethacrylate, dimethylolethane dimethacrylate, ethylene glycol di(meth)acrylate, diethylene glycol di(meth)acrylate, tri ethylene glycol di(meth)acrylate, and dipropylene glycol dimethacrylate.

18. The acrylic composition according to claim 1, wherein the long-chain di(meth)acrylate (A) is included in an amount of from 5 to 85 wt. % in the acrylic composition.

19. The acrylic composition according to claim 1, wherein the mono(meth)acrylate (B) is included in an amount of from 15 to 95 wt. % in the acrylic composition.

20. The acrylic composition according to claim 3, wherein the short-chain di(meth)acrylate (C) is included in the acrylic composition in an amount of from 0.1 weight parts to 10 weight parts based on 100 weight parts of a total of the long-chain di(meth)acrylate (A) and the mono(meth)acrylate (B).

21. The acrylic composition according to claim 1, wherein from 10 to 80 weight parts of the long-chain di(meth)acrylate (A) is included per 100 weight parts of a total of the long-chain di(meth)acrylate (A) and the mono(meth)acrylate (B).

\* \* \* \* \*